(12) United States Patent
Lu

(10) Patent No.: US 7,300,011 B1
(45) Date of Patent: Nov. 27, 2007

(54) FISHING REEL HAVING SHOCK-ABSORBING FUNCTION

(76) Inventor: Han-Chi Lu, No.22, Jian-Ren Rd., Taichung City (TW)

( * ) Notice: Subject to any disclaimer, the term of this patent is extended or adjusted under 35 U.S.C. 154(b) by 17 days.

(21) Appl. No.: 11/633,611

(22) Filed: Dec. 4, 2006

(51) Int. Cl.
*A01K 89/01* (2006.01)
(52) U.S. Cl. ...................... 242/242; 242/279
(58) Field of Classification Search ........ 242/242, 242/263, 277, 278, 279
See application file for complete search history.

(56) References Cited

U.S. PATENT DOCUMENTS 5,931,398 A * 8/1999 Oh .............................. 242/241

* cited by examiner

*Primary Examiner*—Emmanuel M Marcelo
(74) *Attorney, Agent, or Firm*—Apex Juris, pllc; Tracy M. Heims

(57) ABSTRACT

A fishing reel includes a main body, a spool, a crank, a transmission mechanism, a sliding mechanism, and a damper. The sliding mechanism includes a worm shaft. Thus, when the fishing reel is subjected to an impact, the damper provides a shock-absorbing effect to the fishing reel to prevent the worm shaft from being broken by the impact.

18 Claims, 4 Drawing Sheets

FISHING REEL HAVING SHOCK-ABSORBING FUNCTION

BACKGROUND OF THE INVENTION

1. Field of the Invention

The present invention relates to a fishing reel, and more particularly to a fishing reel having a shock-absorbing function.

2. Description of the Related Art

A conventional fishing reel comprises a main body, and a spool mounted on a side of the main body. A transmission mechanism is mounted in the main body and combined with the crank to drive the spool to rotate. A sliding mechanism is mounted in the main body and engages the transmission mechanism to drive the spool to translate linearly. The main body is combined with a fishing rod. A fishing line is wound around the spool, and a crank is mounted on the main body. When in use, when the crank is driven, the transmission mechanism and the sliding mechanism are driven by the crank to drive the spool respectively so that the spool is rotated and translates linearly so as to wind or unwind the fishing line.

However, when the fishing reel is hit by a foreign object or dropped onto the ground, the transmission mechanism and the sliding mechanism are impacted and loosened so that the sliding mechanism cannot engage the transmission mechanism exactly, and the spool cannot be operated smoothly.

SUMMARY OF THE INVENTION

The present invention is to mitigate and/or obviate the disadvantage of the conventional fishing reel.

The primary objective of the present invention is to provide a fishing reel having a shock-absorbing function.

Another objective of the present invention is to provide a fishing reel, wherein the damper is mounted between one end of the worm shaft and the wall of the main body to provide a shock-absorbing effect when the fishing reel is hit by a foreign object or dropped onto the ground to prevent the worm shaft from being deflected or loosened, so that the worm shaft engages the slider exactly, and the fishing reel is operated smoothly.

A further objective of the present invention is to provide a fishing reel, wherein the damper provides a shock-absorbing effect to the fishing reel to prevent the worm shaft from being worn out or broken when the fishing reel is hit by a foreign object or dropped onto the ground, thereby enhancing the lifetime of the fishing reel.

A further objective of the present invention is to provide a fishing reel, wherein the damper provides a shock-absorbing effect to the sliding mechanism, so that the sliding mechanism engages the transmission mechanism exactly, and the spool is operated smoothly.

Further benefits and advantages of the present invention will become apparent after a careful reading of the detailed description with appropriate reference to the accompanying drawings.

DETAILED DESCRIPTION OF THE INVENTION

Figure 1:
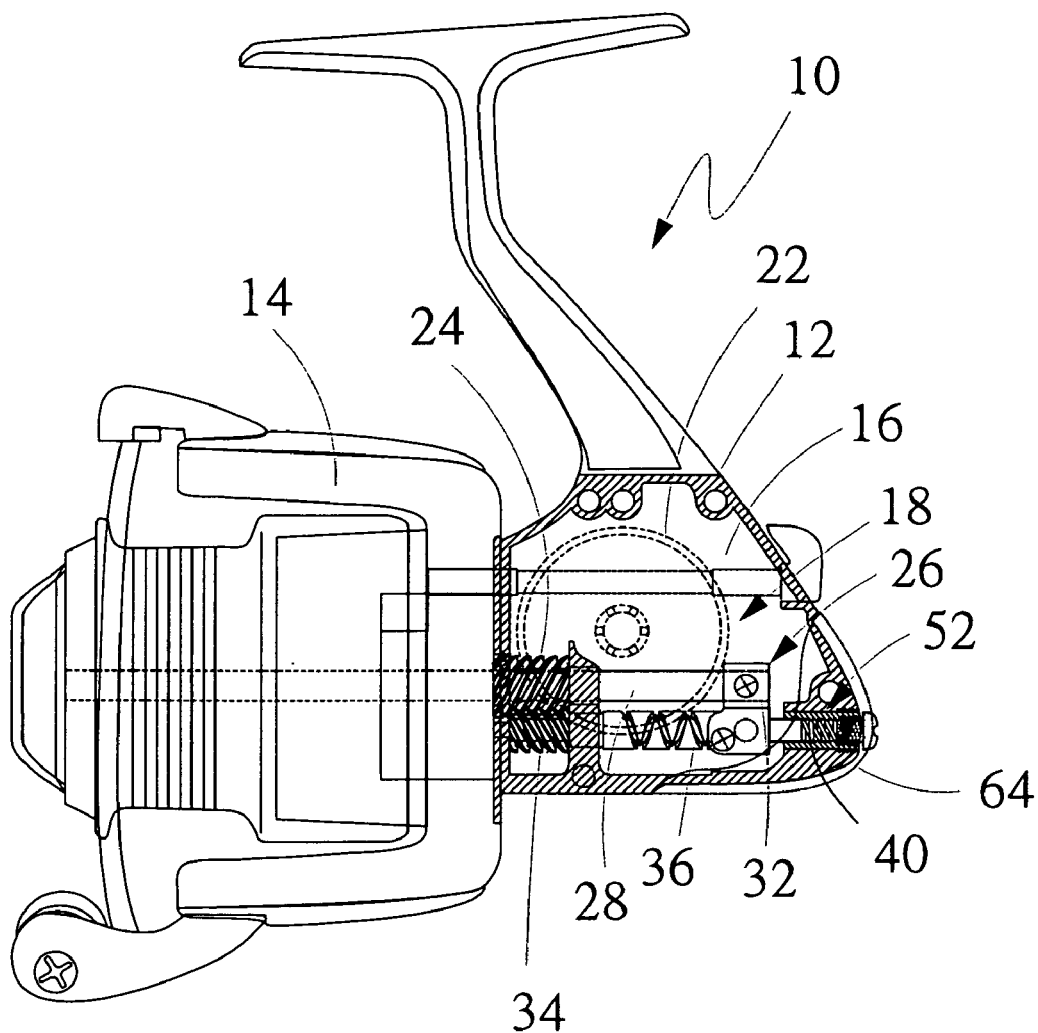
FIG. 1 is a plan cross-sectional view of a fishing reel in accordance with the preferred embodiment of the present invention.

Referring to the drawings and initially to FIG. 1, a fishing reel 10 in accordance with the preferred embodiment of the present invention comprises a main body 12, and a spool 14 mounted on a side of the main body 12. A fishing line (not shown) is wound around the spool 14, and a crank (not shown) is mounted on the main body 12.

The main body 12 has an inside formed with a cavity 16. A transmission mechanism 18 is mounted in the cavity 16 of the main body 12 and combined with the crank. The transmission mechanism 18 includes a main gear 22 and a pinion 24. The main gear 22 of the transmission mechanism 18 is combined with the crank to rotate with the crank simultaneously. The pinion 24 of the transmission mechanism 18 has one end combined with the spool 14 and has a peripheral toothed portion meshing with the main gear 22 so that when the main gear 22 is rotated, the pinion 24 is also rotated to rotate the spool 14.

A sliding mechanism 26 is mounted in the cavity 16 of the main body 12 and engages the transmission mechanism 18. The sliding mechanism 26 includes a main shaft 28, a slider 32, an oscillation gear 34 and a worm shaft 36.

The main shaft 28 of the sliding mechanism 26 is axially extended into the pinion 24 of the transmission mechanism 18 and combined with the spool 14. The oscillation gear 34 of the sliding mechanism 26 is rotatably mounted in the cavity 16 of the main body 12 and meshes with the pinion 24 of the transmission mechanism 18. The worm shaft 36 of the sliding mechanism 26 has a first end combined with one end of the oscillation gear 34 and a second end pivotally mounted on a wall of the main body 12. The slider 32 of the sliding mechanism 26 is mounted on a distal end of the main shaft 28 spaced from the spool 14 and engages a peripheral toothed portion of the worm shaft 36.

The oscillation gear 34 and the worm shaft 36 of the sliding mechanism 26 are two individual parts and can be connected and combined with each other so that the oscillation gear 34 and the worm shaft 36 of the sliding mechanism 26 are rotated synchronously. Alternatively, the oscillation gear 34 and the worm shaft 36 of the sliding mechanism 26 are integrally formed by a rod.

Thus, when the main gear 22 is rotated, the pinion 24 is also rotated to rotate the gear 34 which rotates the worm shaft 36 which drives the slider 32 to translate linearly and reciprocally so that the main shaft 28 is driven by the slider 32 to translate linearly and reciprocally, and the spool 14 is also driven by the main shaft 28 to translate linearly and reciprocally.

A damper 40 is mounted between the worm shaft 36 of the sliding mechanism 26 and the wall of the main body 12. In the preferred embodiment of the present invention, the damper 40 is a spring. The wall of the main body 12 is formed with a receiving chamber 52 to receive the damper 40.

Figure 2:
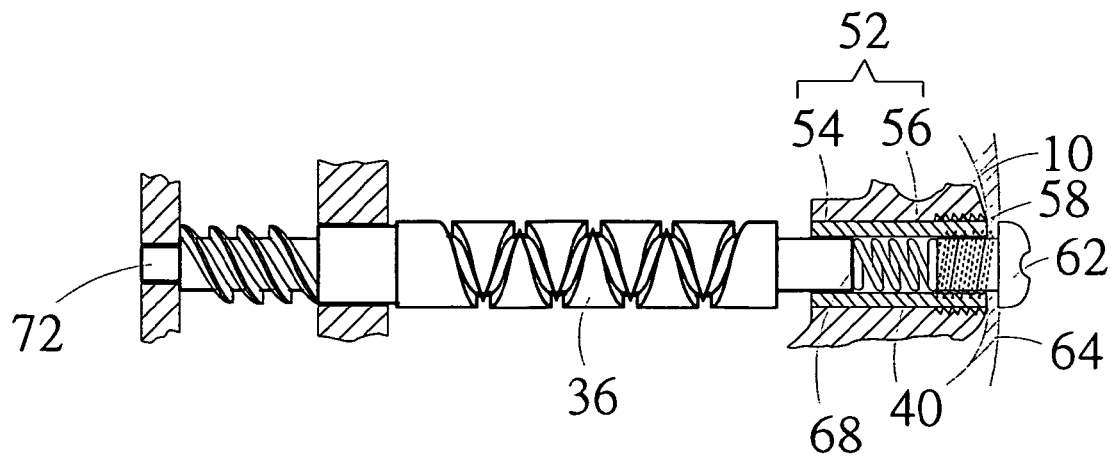
FIG. 2 is a locally enlarged view of the fishing reel as shown in FIG. 1.

Referring to FIGS. 1 and 2, the receiving chamber 52 of the main body 12 consists of a passage 54 and a mounting tube 56 mounted in the passage 54. In the preferred embodiment of the present invention, the passage 54 of the main body 12 has two open ends each having a diameter equal to or slightly greater than that of the worm shaft 36 of the sliding mechanism 26, so that the worm shaft 36 can be extended into and received in the main body 12. Then, the mounting tube 56 is mounted in the passage 54. The mounting tube 56 has a diameter equal to that of one end of the worm shaft 36, so that the one end of the worm shaft 36 is pivotally mounted in the mounting tube 56. The damper 40 is mounted in the mounting tube 56 and has a first end contacting the one end of the worm shaft 36 and a second end rested on a closed face 58. In the preferred embodiment of the present invention, the closed face 58 consists of a screw 62 which is extended through a protective cover 64 and screwed into the main body 12 to attach the protective cover 64 to the main body 12.

Figure 3:
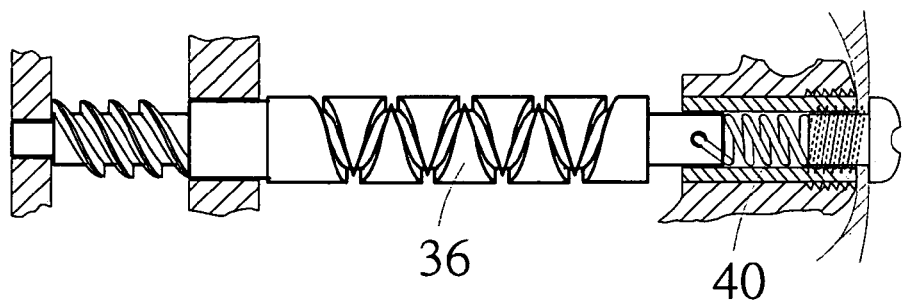
FIG. 3 is a locally plan cross-sectional view of a fishing reel in accordance with another preferred embodiment of the present invention.

Referring to FIG. 3, the damper 40 has a first end hooked on the one end of the worm shaft 36.

Figure 4:
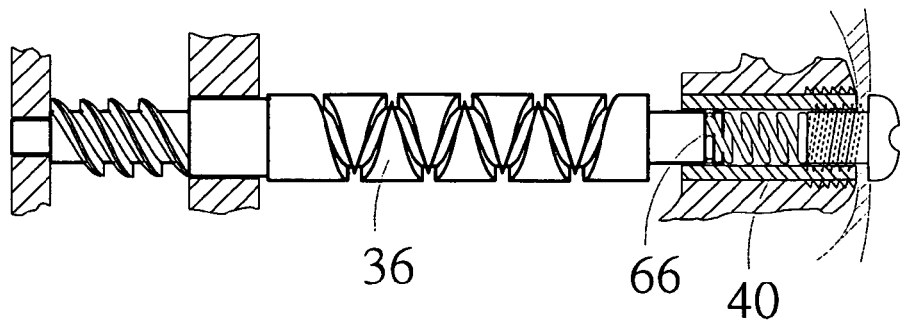
FIG. 4 is a locally plan cross-sectional view of a fishing reel in accordance with another preferred embodiment of the present invention.

Referring to FIG. 4, the one end of the worm shaft 36 is formed with a groove 66, and the damper 40 has a first end secured in the groove 66 of the worm shaft 36.

Referring to FIG. 2, the worm shaft 36 has a first end 68 and a second end 72, and the damper 40 is mounted between the first end 68 of the worm shaft 36 and the wall of the main body 12.

Figure 5:
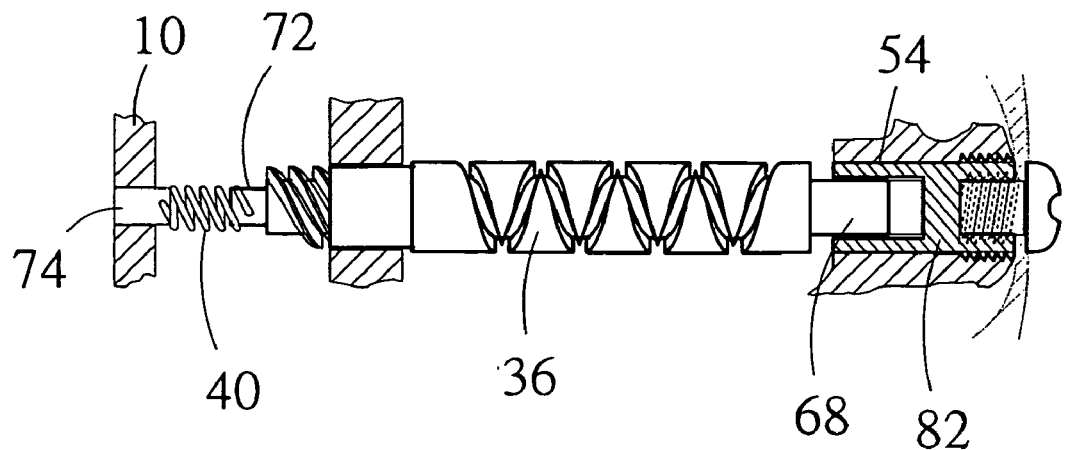
FIG. 5 is a locally plan cross-sectional view of a fishing reel in accordance with another preferred embodiment of the present invention.

Referring to FIG. 5, the damper 40 is mounted between the second end 72 of the worm shaft 36 and the wall of the main body 12. In the preferred embodiment of the present invention, a rotor 74 is rotatably mounted on the wall of the main body 12, and the damper 40 is hooked between the second end 72 of the worm shaft 36 and the rotor 74. In addition, a pivot block 82 is secured in the passage 54 of the main body 12, and the first end 68 of the worm shaft 36 is pivotally mounted on the pivot block 82.

Figure 6:
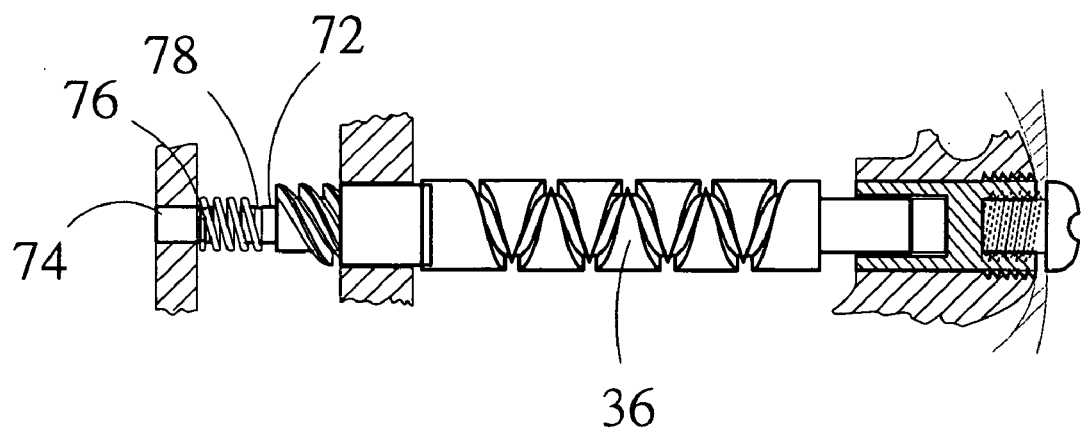
FIG. 6 is a locally plan cross-sectional view of a fishing reel in accordance with another preferred embodiment of the present invention.

Referring to FIG. 6, the rotor 74 has a surface formed with a groove 76, the second end 72 of the worm shaft 36 has a surface formed with a groove 78, and the damper 40 is combined between the groove 78 of the worm shaft 36 and the groove 76 of the rotor 74.

The worm shaft 36 and the damper 40 are rotatable so that the rotor 74 is rotatable with the worm shaft 36 and the damper 40 synchronously. Thus, the rotor 74 is rotatable relative to the wall of the main body 12.

Figure 7:
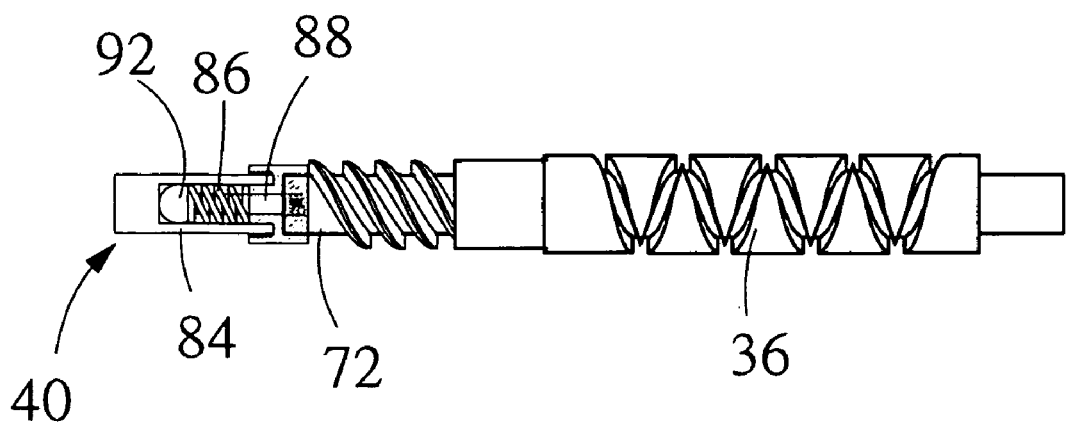
FIG. 7 is a locally plan cross-sectional view of a fishing reel in accordance with another preferred embodiment of the present invention.

Referring to FIG. 7, the damper 40 includes an enclosure 84, an elastic member 86 mounted in the enclosure 84, and a link 88 having a first end formed with a ball 92 rested on one end of the elastic member 86 and a second end protruded from the enclosure 84 and connected to the second end 72 of the worm shaft 36.

Figure 8:
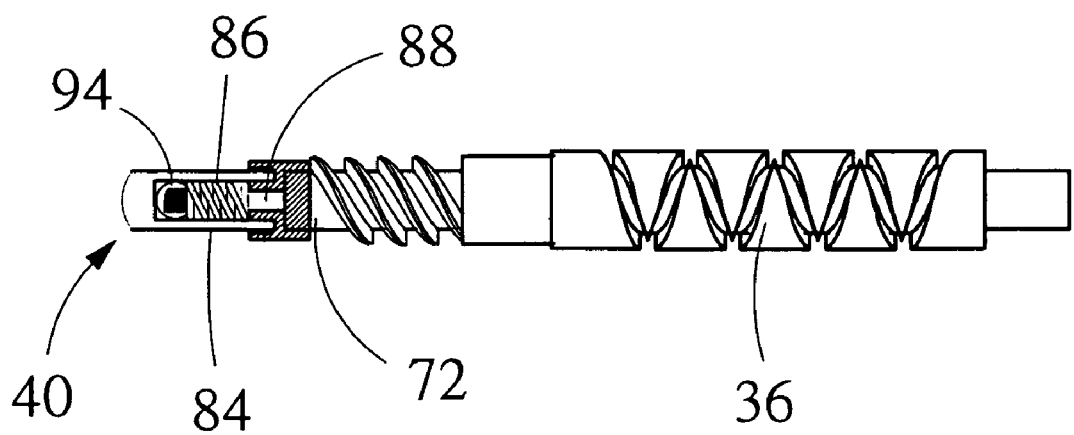
FIG. 8 is a locally plan cross-sectional view of a fishing reel in accordance with another preferred embodiment of the present invention.

Referring to FIG. 8, the damper 40 includes an enclosure 84, an elastic member 86 mounted in the enclosure 84, a ball 94 mounted in the enclosure 84 and rested on one end of the elastic member 86, and a link 88 having a first end extended through the enclosure 84 and combined with the ball 94 and a second end connected to the second end 72 of the worm shaft 36. Alternatively, the link 88 extends from the second end 72 of the worm shaft 36.

Accordingly, a damper 40 is mounted between one end of the worm shaft 36 and the wall of the main body 12 to provide a shock-absorbing effect when the fishing reel 10 is hit by a foreign object or dropped onto the ground to prevent the worm shaft 36 from being deflected or loosened, so that the worm shaft 36 engages the slider 32 exactly, and the fishing reel 10 is operated smoothly. In addition, the damper 40 provides a shock-absorbing effect to the fishing reel 10 to prevent the worm shaft 36 from being worn out or broken when the fishing reel 10 is hit by a foreign object or dropped onto the ground, thereby enhancing the lifetime of the fishing reel 10. Further, the damper 40 provides a shock-absorbing effect to the sliding mechanism 26, so that the sliding mechanism 26 engages the transmission mechanism 18 exactly, and the spool 14 is operated smoothly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A fishing reel, comprising:
    a main body
    a spool mounted on a side of the main body;
    a crank mounted on the main body;
    a transmission mechanism mounted in the main body and combined with the crank to drive the spool to rotate;
    a sliding mechanism mounted in the main body and engaging the transmission mechanism to drive the spool to translate linearly, wherein the sliding mechanism includes a worm shaft;
    the main body having a wall formed with a receiving chamber into which one end of the worm shaft is inserted;
    a damper mounted between one end of the worm shaft and the wall of the main body and received in the receiving chamber of the main body;
    wherein when the fishing reel is subjected to an impact, the damper provides a shock-absorbing effect to the fishing reel to prevent the worm shaft from being broken by the impact.

2. The fishing reel in accordance with claim 1, wherein the damper is a spring.

3. The fishing reel in accordance with claim 1, wherein the damper has two ends rested on one end of the worm shaft and the wall of the main body respectively.

4. The fishing reel in accordance with claim 1, wherein the damper has a first end hooked on one end of the worm shaft and a second end rested on the wall of the main body.

5. The fishing reel in accordance with claim 1, wherein the one end of the worm shaft has a groove, and the damper has a first end combined with the groove of the worm shaft and a second end rested on the wall of the main body.

6. The fishing reel in accordance with claim 1, wherein the receiving chamber of the main body includes a passage formed in the wall of the main body, and a mounting tube securely mounted in the passage and having one end provided with a closed face, one end of the worm shaft is mounted in the mounting tube, and the damper is mounted in the mounting tube and has a first end contacting the one end of the worm shaft and a second end rested on the closed face.

7. The fishing reel in accordance with claim 6, wherein the closed face consists of a screw which is screwed into one end of the mounting tube.

8. The fishing reel in accordance with claim 6, wherein the worm shaft has a first end and a second end, and the first end of the worm shaft is mounted in the mounting tube.

9. The fishing reel in accordance with claim 1, wherein the worm shaft has a first end and a second end, the second end of the worm shaft is mounted in the receiving chamber of the main body.

10. A fishing reel, comprising:
a main body
a spool mounted on a side of the main body;
a crank mounted on the main body;
a transmission mechanism mounted in the main body and combined with the crank to drive the spool to rotate;
a sliding mechanism mounted in the main body and engaging the transmission mechanism to drive the spool to translate linearly, wherein the sliding mechanism includes a worm shaft having a first end and a second end, and the first end of the worm shaft is pivotally mounted in a wall of the main body;
a rotor rotatably mounted on the wall of the main body and located opposite to the second end of the worm shaft;
a damper having a first end connected to the second end of the worm shaft and a second end connected to the rotor;
wherein when the fishing reel is subjected to an impact, the damper provides a shock-absorbing effect to the fishing reel to prevent the worm shaft from being broken by the impact.

11. The fishing reel in accordance with claim 10, wherein the second end of the worm shaft has a groove combined with the first end of the damper.

12. The fishing reel in accordance with claim 10, wherein the rotor has a groove combined with the second end of the damper.

13. The fishing reel in accordance with claim 10, wherein the main body is provided with a passage and a pivot block secured in the passage, and the first end of the worm shaft is pivotally mounted on the pivot block.

14. The fishing reel in accordance with claim 10, wherein the damper is a spring.

15. A fishing reel, comprising:
a main body
a spool mounted on a side of the main body;
a crank mounted on the main body;
a transmission mechanism mounted in the main body and combined with the crank to drive the spool to rotate;
a sliding mechanism mounted in the main body and engaging the transmission mechanism to drive the spool to translate linearly, wherein the sliding mechanism includes a worm shaft having a first end and a second end, and the first end of the worm shaft is pivotally mounted in a wall of the main body;
a damper mounted on the wall of the main body and combined with the second end of the worm shaft, wherein the damper includes an enclosure, an elastic member mounted in the enclosure, and a link having a first end connected to the elastic member and a second end connected to the second end of the worm shaft;
wherein when the fishing reel is subjected to an impact, the damper provides a shock-absorbing effect to the fishing reel to prevent the worm shaft from being broken by the impact.

16. The fishing reel in accordance with claim 15, wherein the damper is a spring, and the link is axially extended into the spring and has one end formed with a ball rested on one end of the spring.

17. The fishing reel in accordance with claim 15, wherein the damper further includes a ball mounted on one end of the elastic member, and the link has a first end axially extended through elastic member and combined with the ball and a second end connected to the second end of the worm shaft.

18. The fishing reel in accordance with claim 17, wherein the link extends from the second end of the worm shaft.

* * * * *